(12) United States Patent
Takeda et al.

(10) Patent No.: US 12,120,745 B2
(45) Date of Patent: Oct. 15, 2024

(54) USER TERMINAL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 541 days.

(21) Appl. No.: 17/430,916

(22) PCT Filed: Feb. 15, 2019

(86) PCT No.: PCT/JP2019/005671
§ 371 (c)(1),
(2) Date: Aug. 13, 2021

(87) PCT Pub. No.: WO2020/166078
PCT Pub. Date: Aug. 20, 2020

(65) Prior Publication Data
US 2022/0132582 A1 Apr. 28, 2022

(51) Int. Cl.
*H04W 74/08* (2024.01)
*H04W 74/0833* (2024.01)
*H04W 8/26* (2009.01)

(52) U.S. Cl.
CPC .............................. *H04W 74/0833* (2013.01)

(58) Field of Classification Search
CPC ... H04W 74/0833; H04W 74/04; H04W 8/26; H04W 74/004; H04W 74/006
See application file for complete search history.

(56) References Cited

U.S. PATENT DOCUMENTS

| | | | | |
|---|---|---|---|---|
| 10,568,007 B2* | 2/2020 | Park | ....................... | H04W 36/30 |
| 10,945,290 B2* | 3/2021 | Jeon | ..................... | H04W 74/004 |
| 11,259,331 B2* | 2/2022 | Jeon | ..................... | H04W 74/006 |
| 11,375,536 B2* | 6/2022 | Shah | ..................... | H04W 74/004 |
| 11,399,393 B2* | 7/2022 | Jeon | .................. | H04W 74/0808 |

(Continued)

FOREIGN PATENT DOCUMENTS

| | | |
|---|---|---|
| JP | 2013-074447 A | 4/2013 |
| WO | 2018/139575 A1 | 8/2018 |

OTHER PUBLICATIONS

Office Action issued in the counterpart Japanese Patent Application No.: 2020-572052, mailed on Jun. 6, 2023 (6 pages).

(Continued)

*Primary Examiner* — Eunsook Choi
(74) *Attorney, Agent, or Firm* — Osha Bergman Watanabe & Burton LLP

(57) ABSTRACT

To appropriately perform communications even when a random access procedure with less steps than existing steps is performed, an aspect of a user terminal according to the present disclosure includes a transmitting section that transmits a UL signal including a random access preamble and a certain message, a receiving section that receives a DL signal transmitted in response to the UL signal, and a control section that controls at least one of transmission of the UL signal and reception of the DL signal by applying a common behavior to a first procedure for transmitting the UL signal in accordance with an indication from a network and a second procedure for transmitting the UL signal without any indication from the network.

5 Claims, 11 Drawing Sheets

(56) References Cited

U.S. PATENT DOCUMENTS

| | | | | |
|---|---|---|---|---|
| 11,445,549 | B2* | 9/2022 | Yerramalli | H04W 52/50 |
| 11,638,300 | B2* | 4/2023 | Zhang | H04W 72/0446 |
| | | | | 370/329 |
| 11,647,543 | B2* | 5/2023 | Dinan | H04W 74/0833 |
| | | | | 370/329 |
| 11,700,641 | B2* | 7/2023 | Kim | H04W 72/21 |
| | | | | 370/329 |
| 2014/0226614 | A1 | 8/2014 | Kato et al. | |
| 2018/0279375 | A1 | 9/2018 | Jeon et al. | |
| 2020/0221506 | A1* | 7/2020 | Jeon | H04W 74/0833 |
| 2021/0243814 | A1* | 8/2021 | Zhang | H04W 74/0833 |
| 2021/0337597 | A1 | 10/2021 | Yoshimura et al. | |

OTHER PUBLICATIONS

Vivo; "CR on MSG1 SCS in dedicated RACH"; 3GPP TSG-RAN WG2 Meeting #Ad hoc 1802, R2-1810619; Montreal, Canada; Jul. 2-6, 2018 (6 pages).

International Search Report issued in International Application No. PCT/JP2019/005671, mailed on Apr. 9, 2019 (12 pages).

Written Opinion issued in International Application No. PCT/JP2019/005671, mailed on Apr. 9, 2019 (8 pages).

3GPP TS 36.300 V8.12.0, Release 8; "3rd Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

3GPP TSG-RAN WG2 Meeting #104; R2-1818162; "Considerations on Common 2-Step RACH;" III; Nov. 12-16, 2018; Spokane, USA (4 pages).

3GPP TSG-RAN WG2 Meeting #104; R2-1818128; "Discussion on UE ID for msgA;" CMCC; Nov. 12-16, 2018; Spokane, USA (3 pages).

3GPP TSG-RAN WG2 Meeting #104; R2-1816687; "2-step RACH msgB addressing and HARQ;" MediaTek Inc.; Nov. 12-16, 2018; Spokane, USA (5 pages).

Office Action issued in Chinese Patent Application No.: 201980095444.9, mailed on Sep. 29, 2023 (15 pages).

Extended European Search Report issued in counterpart European Patent Application No. 19915205.9, mailed on Jul. 29, 2022 (14 pages).

Huawei et al.; "Consideration on UE ID for 2-step RACH"; 3GPP TSG-RAN WG2 Meeting #104, R2-1816606; Spokane, US; Nov. 12-16, 2018 (3 pages).

MediaTek Inc.; "2-step RACH msgA and msgB contents"; 3GPP TSG-RAN WG2 Meeting #104, R2-1816685; Spokane, US; Nov. 12-16, 2018 (7 pages).

Samsung; "RAR detection for contention free random access"; 3GPP TSG RAN WG1 Meeting 90bis, R1-1717590; Prague, CZ; Oct. 9-13, 2017 (2 pages).

* cited by examiner

|  | (SUPPORT FOR RETRANSMISSION CONTROL OF MSG. A, SUPPORT FOR RETRANSMISSION CONTROL OF MSG. B) | | | |
| --- | --- | --- | --- | --- |
| CB RACH | (Yes, Yes) | (Yes, No) | (No, Yes) | (No, No) |
| CF RACH | (Yes, Yes) | (Yes, No) | (No, Yes) | (No, No) |
|  | CASE A | CASE B | CASE C | CASE D |

FIG. 7

USER TERMINAL

TECHNICAL FIELD

The present disclosure relates to a user terminal in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency, and so on (see Non-Patent Literature 1). In addition, for the purpose of further high capacity, advancement, and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (e.g., LTE Rel. 8 to Rel. 13), a user terminal (UE (User Equipment)) controls downlink shared channel (e.g., Physical Downlink Shared Channel (PDSCH)) reception, based on downlink control information (Downlink Control Information (DCI), also referred to as a DL assignment, etc.) from a radio base station. The UE also controls uplink shared channel (e.g., Physical Uplink Shared Channel (PUSCH)) transmission, based on the DCI (also referred to as a UL grant, etc.).

Further, in the existing LTE systems, a user terminal can transmit UL data when UL synchronization is established between a radio base station and the user terminal. As such, the existing LTE systems support a random access procedure (a RACH procedure (Random Access Channel Procedure), also referred to as an access procedure) for establishing UL synchronization.

The random access procedure of the existing LTE systems supports four steps (Messages 1 to 4). For example, in the random access procedure, a user terminal transmits a random access preamble (PRACH) corresponding to Message 1 to a base station, and acquire information regarding UL transmission timing through a response signal (a random access response or Message 2) to the PRACH from a radio base station. Then, the user terminal transmits a message using an uplink shared channel (Message 3) based on the information acquired through Message 2, and receives Message 4 (also, referred to as contention-resolution) transmitted from the base station.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

It is studied that communications are performed using beam forming (BF) in future radio communication systems (e.g., NR, 5G, 5G+, or Rel. 16 or later versions). For example, it is predicted that a UE and a base station transmit/receive signals (or channels) by using at least one of a plurality of transmission/reception points and a plurality of beams.

It is also considered that, in the future radio communication systems, a random access procedure is performed using less steps (e.g., two steps) than existing four steps.

Although how to control the random access procedure that uses less steps than the existing four steps in the future radio communication systems becomes a problem, specific behaviors, etc. have not been fully discussed. If the random access procedure is not appropriately performed, communication quality may be degraded.

The present disclosure has been made in light of these problems. An objective of the present disclosure is to provide a user terminal that can appropriately perform communications even when a random access procedure with less steps than existing steps is performed.

Solution to Problem

A user terminal according to an aspect of the present disclosure includes a transmitting section that transmits a UL signal including a random access preamble and a certain message, a receiving section that receives a DL signal transmitted in response to the UL signal, and a control section that controls at least one of transmission of the UL signal and reception of the DL signal by applying a common behavior to a first procedure for transmitting the UL signal in accordance with an indication from a network and a second procedure for transmitting the UL signal without any indication from the network.

Advantageous Effects of Invention

According to an aspect of the present disclosure, communications can be appropriately performed even when a random access procedure with less steps than existing steps is performed.

BRIEF DESCRIPTION OF DRAWINGS

FIG. 7 is a diagram to show an example of a configuration of retransmission control of Message A and retransmission control of Message B;

DESCRIPTION OF EMBODIMENTS

The existing LTE systems (e.g., LTE Rel. 8 to Rel. 13) support a random access procedure for establishing UL synchronization. The random access procedure includes contention-based random access (also referred to as CBRA, etc.) and non-contention-based random access (also referred to as Non-CBRA, contention-free random access (CFRA), etc.).

In the contention-based random access (CBRA), a user terminal transmits a preamble that is randomly selected from a plurality of preambles (also referred to as a random access preamble, a random access channel (Physical Random Access Channel (PRACH), a RACH preamble, etc.) that are defined for each cell. The contention-based random access is a random access procedure led by a user terminal and, for example, can be used upon initial access, start or restart of UL transmission, etc.

In contrast, in the non-contention-based random access (Non-CBRA, CFRA), a radio base station assigns a preamble specifically to a user terminal using a downlink (DL) control channel (PDCCH (Physical Downlink Control Channel)), and the user terminal transmits the preamble assigned by the radio base station. The non-contention-based random access is a random access procedure led by a network and, for example, can be used upon handover, start or restart of DL transmission (upon start or restart of transmission of DL retransmission indication information in UL), etc.

Figure 1:
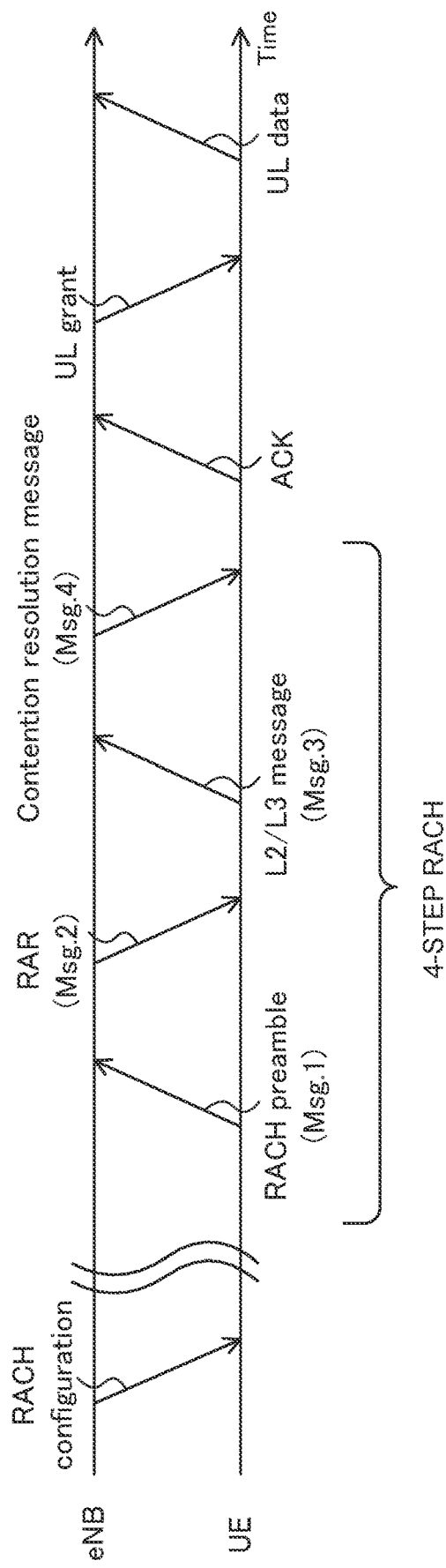
FIG. 1 is a diagram to show an example of a four-step RACH.

FIG. 1 is a diagram to show an example of contention-based random access. In FIG. 1, a user terminal receives, in advance, information indicating a random access channel (PRACH) configuration (PRACH configuration, RACH configuration) (PRACH configuration information) through system information (e.g., an MIB (Mater Information Block) and/or an SIB (System Information Block)) and higher layer signaling (e.g., RRC (Radio Resource Control) signaling).

For example, the PRACH configuration information may indicate a plurality of preambles defined for each cell (e.g., a preamble format), time resources used for PRACH transmission (e.g., a system frame number, a subframe number) and frequency resources (e.g., an offset that indicates the start position of six resource blocks (PRB (Physical Resource Block)) (prach-FrequencyOffset)), etc.

As shown in FIG. 1, in a case of shifting from an idle state (RRC_IDLE) to an RRC connected state (RRC_CONNECTED) (e.g., at the time of initial access), a case where UL synchronization has not been established in the RRC connected state (e.g., upon start or restart of UL transmission), etc., the user terminal randomly selects one of a plurality of preambles indicated by PRACH configuration information and transmits the selected preamble by using a PRACH (Message 1).

When a radio base station detects the preamble, the radio base station transmits a random access response (RAR) as a response to the preamble (Message 2). After transmitting the preamble, if the user terminal fails to receive the RAR within a certain period (an RAR window), the user terminal transmits again (retransmits) the preamble with an increased PRACH transmission power. Note that increasing transmission power upon retransmission is also referred to as power ramping.

The user terminal that has received the RAR establishes UL synchronization by adjusting UL transmission timing, based on timing advance (TA) included in the RAR. The user terminal further transmits a higher layer (L2/L3 (Layer 2/Layer 3)) control message using a UL resource that is specified by a UL grant included in the RAR (Message 3). The control message includes an identifier of the user terminal (UE-ID). The identifier of the user terminal may be, for example, C-RNTI (Cell-Radio Network Temporary Identifier) if in the RRC connected state or higher layer UE-ID, such as S-TMSI (System Architecture Evolution-Temporary Mobile Subscriber Identity), if in the idle state.

The radio base station transmits a contention resolution message (Message 4) in response to the higher layer control message. The contention resolution message is transmitted, based on the addressed identifier of the user terminal included in the above-described control message. The user terminal that successfully detected the contention resolution message transmits an acknowledgement (ACK (Acknowledge)) of a HARQ (Hybrid Automatic Repeat reQuest) to the radio base station. In this way, the user terminal in the idle state shifts to the RRC connected state.

On the other hand, the user terminal that failed to detect the contention resolution message determines the occurrence of a contention, reselects a preamble, and repeats the random access procedure of Messages 1 to 4. The radio base station, when detecting that the contention was resolved through the ACK from the user terminal, transmits a UL grant to the user terminal. The user terminal starts the UL data by using the UL resource assigned by the UL grant.

In the above-described contention-based random access, if a user terminal desires UL data transmission, the user terminal can autonomously start a random access procedure. Further, the UL data is transmitted after UL synchronization is established, using the UL resource that is assigned specifically to the user terminal by the UL grant, which allows highly reliable UL transmission.

In the meantime, it is studied that less steps than existing four steps are used to perform a random access procedure in NR. As an example, there is a random access procedure using two steps. The random access procedure using two steps is also referred to as a two-step random access procedure, a two-step RACH, or a 2-step RACH.

Figure 2:
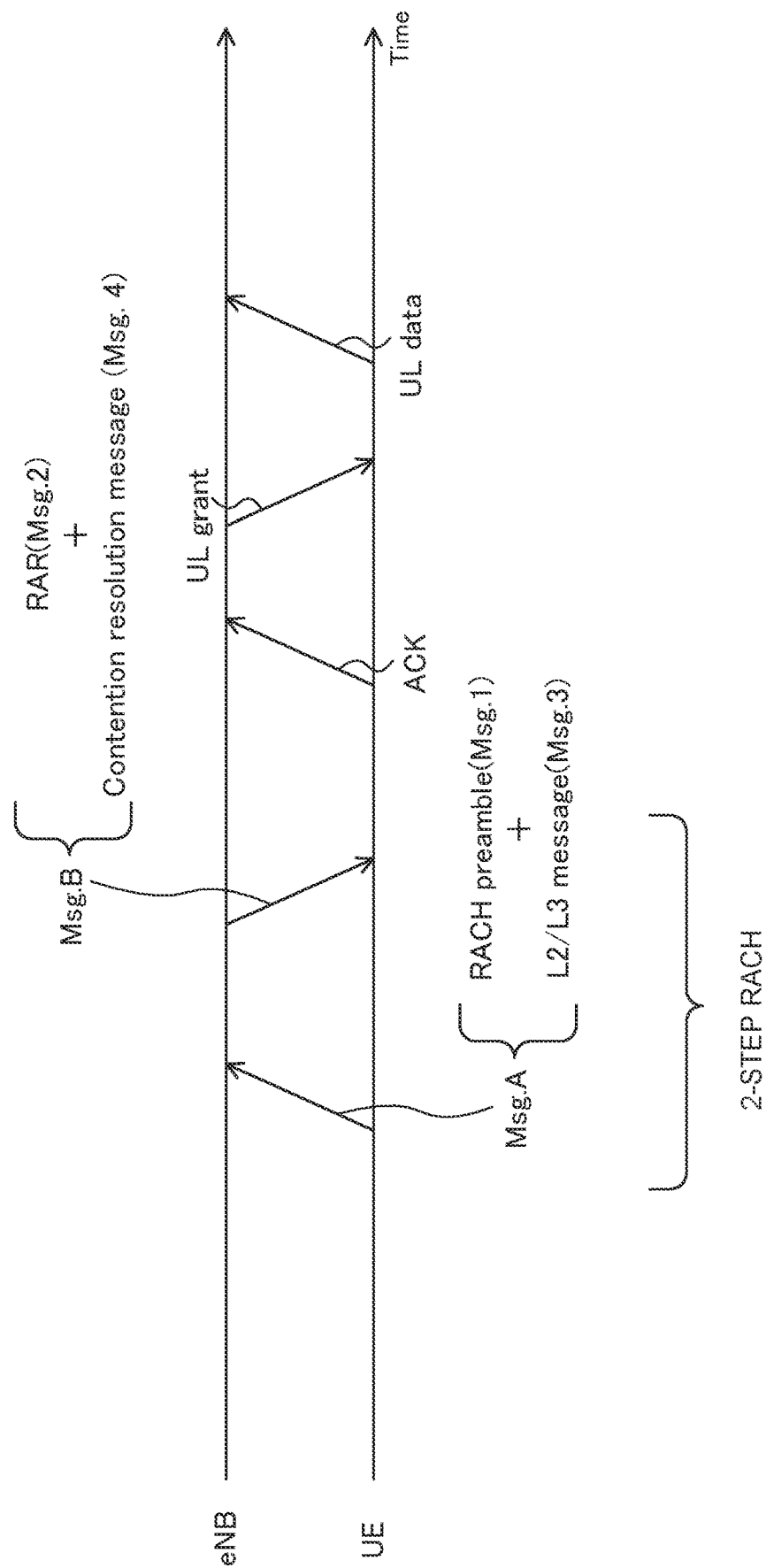
FIG. 2 is a diagram to show an example of a two-step RACH.

The two-step RACH may be configured by a first step where a UE performs transmission to a base station and a second step where the base station performs transmission to the UE (refer to FIG. 2).

For example, at the first step, at least one of a UL signal and a UL channel that include a preamble and a message (hereinafter, also referred to as a UL signal/UL channel) may be transmitted from the UE to the base station. The preamble may be a component that plays a similar role to that of Message 1 (PRACH) in the existing random access procedure. The message may be a component that plays a similar role to that of Message 3 (PUSCH) in the existing random access procedure. Note that the message transmitted at the first step may also be referred to as Message A (Msg. A).

At the second step, at least one of a DL signal and a DL channel that include a response and contention-resolution (hereinafter, also referred to as a DL signal/DL channel) may be transmitted from the base station to the UE. The response may be a component that plays a similar role to that of Message 2 (a random access response (RAR) transmitted by a PDSCH) in the existing random access procedure. The contention-resolution may be a component that plays a similar role to that of Message 4 (PDSCH) in the existing random access procedure. Note that the message transmitted at the second step may also be referred to as Message B (Msg. B).

In this way, when a random access procedure is performed using less steps than those of the existing LTE systems, how to control transmission and reception becomes a problem. For example, it can be considered that the two-step RACH is applied to a contention-based random access procedure and a non-contention-based random access procedure. When the two-step RACH is applied to a non-contention-based random access procedure, a step (a zeroth step) of reporting a DL signal that indicates (or triggers) transmission of Message A to the UE before the first step, may be set.

In this way, when a contention-based random access procedure and a non-contention-based random access procedure that use the two-step RACH are supported, how to control the random access procedure becomes a problem.

The inventors of the present invention came up with the idea, as an aspect of the present disclosure, of commonly controlling behaviors (procedures) of a contention-based random access procedure and a non-contention-based random access procedure that use the two-step RACH or separately controlling certain behaviors.

The inventors of the present invention, as another aspect of the present disclosure, focused on occurrence of cases where the UE or a base station fails to transmit/receive Message A and receive/transmit Message B, and further came up with the idea of controlling retransmission (e.g., whether to perform retransmission, a UL signal/channel to retransmit, etc.), based on the transmission/reception results of Message A and Message B.

The following will describe the present embodiment in detail with reference to the drawings. The following aspects may be applied individually or implemented in combination as necessary. The following description illustrates cases where Message A includes Msg. 1 and Msg. 3 of the four-step RACH and Message B includes Msg. 2 and Msg. 4 of the four-step RACH, without limitation.

(First Aspect)

In a first aspect, a common control (or condition, behavior) is applied to a contention-based random access procedure (CB RACH) and a non-contention-based random access procedure (CF RACH) in a two-step RACH (step 1 and step 2). Note that the common control (or condition, behavior) may refer to a situation where an ID classification that the UE reports, an RNTI classification to be applied to a PDCCH, etc. are the same, where indices, etc. may be different from each other as long as the same RNTI classification is used.

<CB RACH Using Two Steps>

Figure 3:
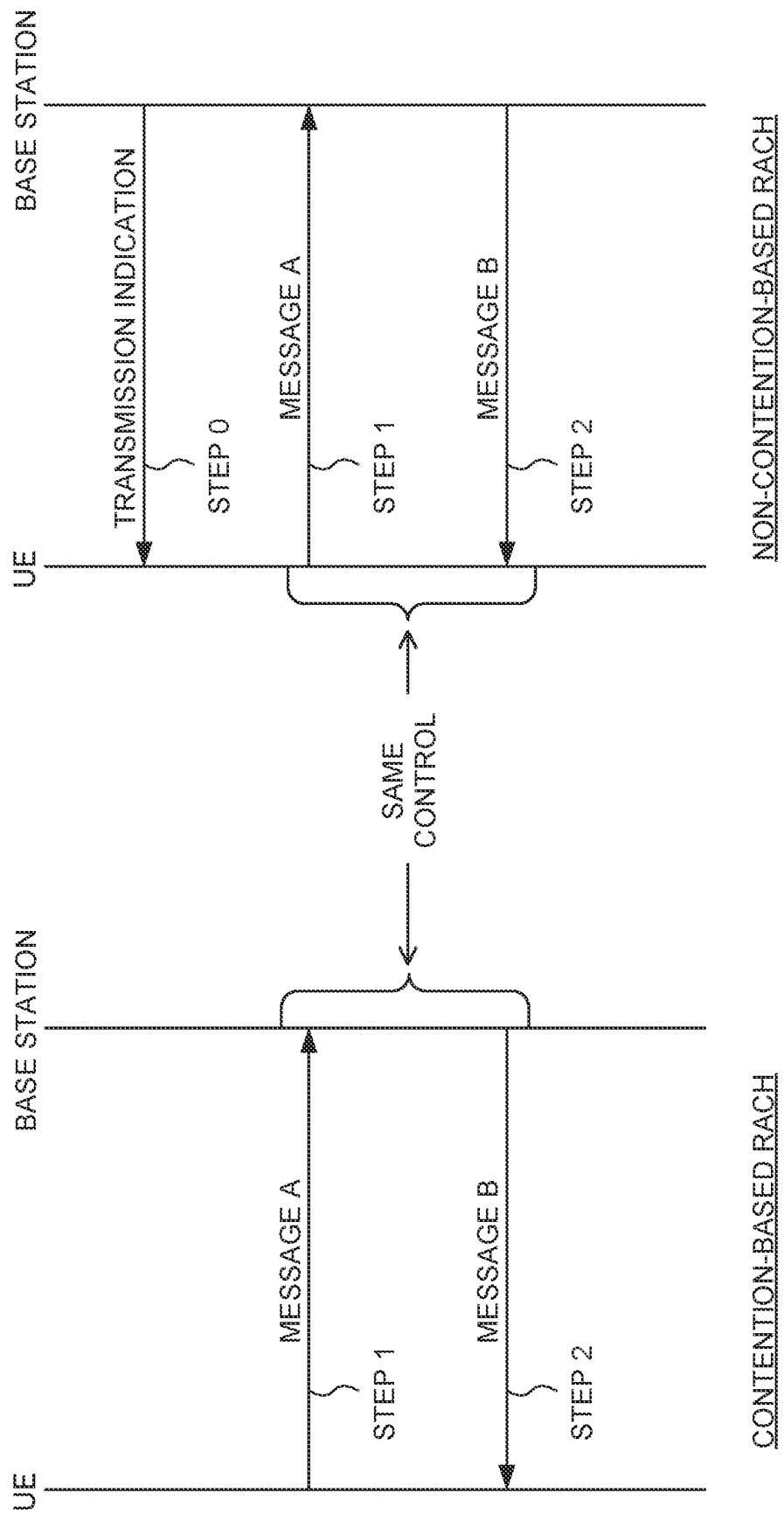
FIG. 3 is a diagram to show an example of a contention-based RACH and a non-contention-based RACH where the two-step RACH is applied.

An example of a contention-based random access procedure using two steps will be described below (refer to FIG. 3). Note that, in a CB RACH, the UE transmits Message A without an indication (e.g., a PDCCH order, a trigger, etc.) of transmitting Message A from a network.

[Step 1]

The UE transmits Message A that includes a random access preamble and a certain message. At least one of a resource and a sequence used for transmission of Message A (hereinafter, referred to as a resource/sequence) may be configured to the UE in advance using at least one of a broadcast channel (or a notification signal) and system information.

In an behavior of applying a plurality of beams (a multi-beam behavior), a different resource/sequence may be associated with each index of a DL reference signal. The DL reference signal may be at least one of a synchronization signal block (also referred to as an SSB, an SS/PBCH block) and a reference signal for channel state information (also referred to as a CSI-RS).

The UE may transmit Message A by using a resource/sequence corresponding to the received DL reference signal (e.g., a DL reference signal with high reception power). In this way, a base station that has received Message A can determine an appropriate DL reference signal index, based on the resource/sequence used for transmitting Message A.

The user identifier included in the Message A (e.g., UE-ID) may be another identifier, instead of an identifier configured from a network (e.g., C-RNTI). The other identifier, which is an identifier other than the one configured from the network, may be, for example, an identifier inside the UE, such as a SIM card number, etc. (e.g., UE internal ID).

In this way, the UE may include an identifier not configured from the network in Message A and thus transmit the identifier. As such, even if an identifier is not configured from the network upon transmission of Message A, a certain identifier can be included in Message A and transmitted.

[Step 2]

The UE receives a response signal (Message B) transmitted in response to transmitted Message A. Message B may be scheduled by a PDCCH transmitted in a common search space. The PDCCH (or a DCI format) may be subject to CRC-scrambling with a radio network identifier for random access (e.g., RA-RNTI).

The UE may acquire information regarding the RA-RNTI that is applied based on the resource/sequence used for transmission of Message A.

<CF RACH Using Two Steps>

An example of a non-contention-based random access procedure using two steps will be described below.

[Step 0]

The UE receives information that indicates transmission of Message A. A network (e.g., a base station) transmits at least one of a PDCCH (or DCI), MAC control information, and higher layer signaling, which trigger transmission of Message A (e.g., PRACH transmission).

The PDCCH that triggers transmission of Message A (e.g., PRACH) may also be referred to as a PDCCH-order. The base station may further transmit a DCI format (e.g., DCI format 1_0) that indicates PRACH transmission using the PDCCH to the UE. Whether the DCI format indicates PRACH transmission or schedules a PDSCH may be determined according to whether one or more certain fields of the DCI format indicates a certain value or not, or may be determined by descrambling the CRC with a plurality of RNTIs to find out which RNTI was used.

The MAC control information that triggers transmission of Message A (e.g., PRACH) may be made by reusing MAC control information that triggers beam failure recovery (BFR).

The higher layer signaling that indicates transmission of Message A (e.g., PRACH) may use a certain higher layer parameter (e.g., RACH-ConfigDedicated).

The base station, at step 0, may specify the type of a non-contention random access procedure to be triggered using at least one of the PDCCH, MAC control information, and higher layer signaling. The type of the non-contention random access procedure may be either the two-step RACH procedure or the four-step RACH procedure.

The UE may determine whether to apply the two-step RACH procedure or the four-step RACH procedure, based on the trigger of Message A transmission. For example, a DCI format (e.g., DCI formation 1_0) that indicates PRACH transmission, MAC control information that triggers transmission of Message A (e.g., a PRACH), and higher layer signaling (e.g., RACH-ConfigDedicated) that indicates transmission of Message A (e.g., a PRACH) may indicate whether to apply the two-step RACH procedure or the four-step RACH procedure. In this way, specifying the type of a random access procedure to be applied at step 0, allows different types of random access procedure to be configured flexibly.

[Step 1]

At step 1, the UE may control transmission of Message A in a similar way to the contention-based random access procedure using two steps.

[Step 2]

At step 2, the UE may control reception of Message B in a similar way to the contention-based random access procedure using two steps.

In this way, UE behaviors, etc., can be simplified by commonly using at least one of step 1 and step 2 in the contention-based random access procedure and the non-contention-based random access procedure to which the two-step RACH is applied.

(Second Aspect)

Figure 4:
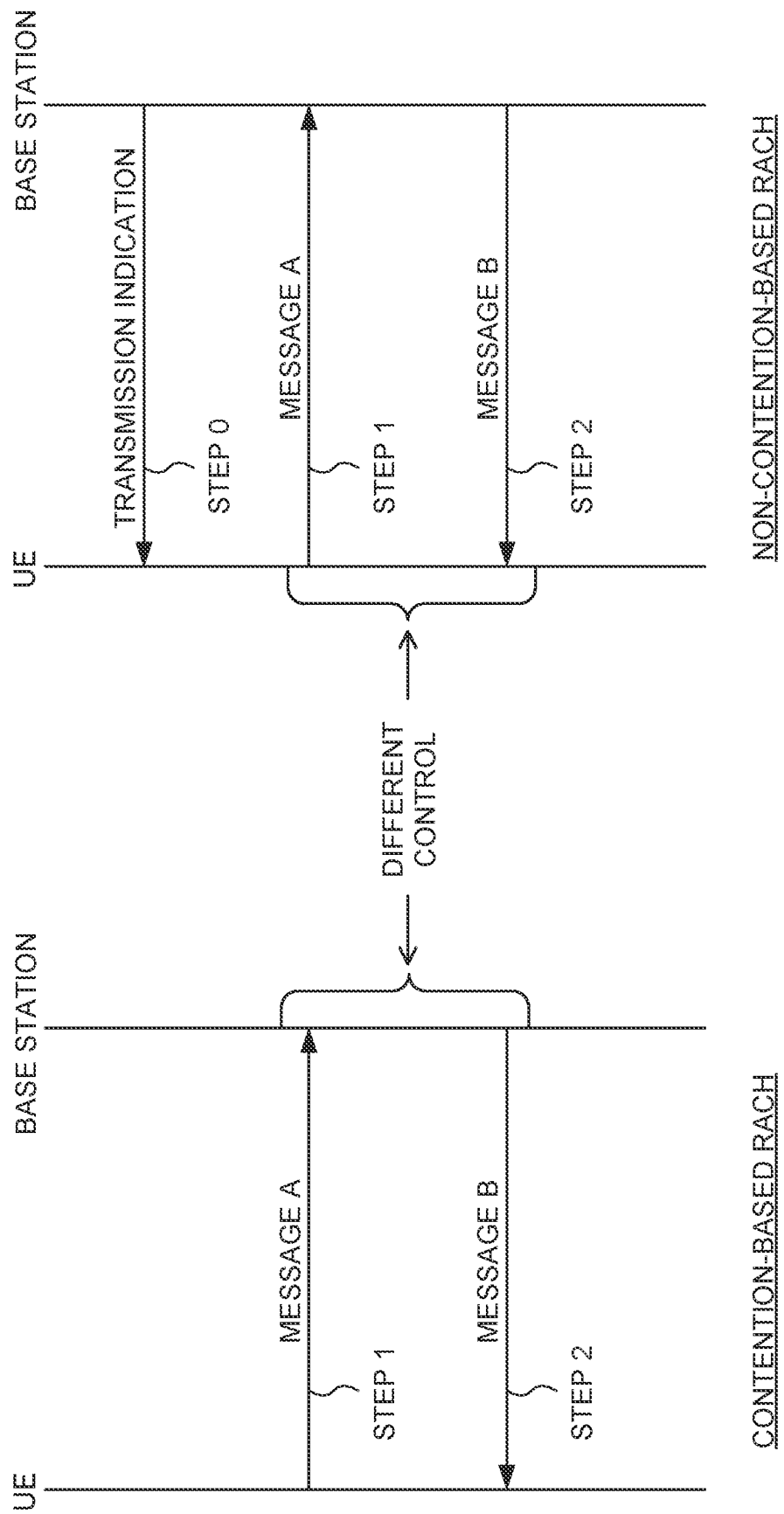
FIG. 4 is a diagram to show another example of the contention-based RACH and the non-contention-based RACH where the two-step RACH is applied.

In a second aspect, different controls (or conditions, behaviors) are applied to certain behaviors of a contention-based random access procedure (CB RACH) and the certain behavior of a non-contention-based random access procedure (CF RACH) in a two-step RACH (step 1 and step 2) (refer to FIG. 4).

<CB RACH Using Two Steps>

A contention-based random access procedure using two steps can be applied in a similar way to the CB RACH of the first aspect.

<CF RACH Using Two Steps>

An example of a non-contention-based random access procedure using two steps will be described below. Note that each behavior that is not particularly described may be controlled in a similar way to the CF RACH of the first aspect.

[Step 0]

Step 0 can be applied in a similar way to step 0 of the CF RACH of the first aspect.

[Step 1]

The UE transmits Message A that includes a random access preamble and a certain message. At least one of a resource and a sequence used for transmission of Message A (hereinafter, also referred to as a resource/sequence) may be configured to the UE in advance using higher layer signaling (dedicated RRC signalling).

In this way, a dedicated control signal (e.g., RRC signaling) can be used to configure a resource/sequence in the CF RACH. Thus, the resource/sequence that is used for transmission of Message A can be flexibly set.

A user identifier (e.g., UE-ID) included in Message A may be a certain RNTI (e.g., C-RNTI). For example, the UE can include an identifier that has already been configured from the network in Message A and thus transmit the identifier.

In this way, in the CF RACH, since the UE recognizes a certain identifier (e.g., a C-RNTI) upon transmission of Message A, the UE can include the certain identifier in Message A and transmit it.

[Step 2]

The UE receives a response signal (Message B) transmitted in response to the transmitted Message A. Message B may be scheduled by a PDCCH transmitted in a common search space or a UE specific search space. The PDCCH may be CRC-scrambled with a certain identifier (e.g., a C-RNTI or an MCS-C-RNTI, etc.) instead of an RA-RNIT.

In this way, the UE behaviors can be simplified without the need for the UE to acquire information regarding the RA-RNTI.

As such, configuring a certain behavior differently between a contention-based random access procedure and a non-contention-based random access procedure where the two-step RACH is applied, allows control according to the type of the random access procedure, whereby the random access procedure can be flexibly controlled.

(Third Aspect)

In a third aspect, retransmission of Message A (a UL signal) transmitted from the UE at step 1 in the two-step RACH (step 1 and step 2) will be described.

In the following description, both case A where a transmission behavior (procedure) of Message A and a reception behavior of Message B are commonly performed (e.g., the CB RACH, CF RACH in the first aspect, the CB RACH in the second aspect) and another case B (e.g., the CF RACH in the second aspect) will be described.

Case a

<Retransmission Control is not Supported>

A configuration may not support retransmission control of Message A. In such a case, if the UE does not receive Message B within a range of a certain period since transmission of Message A, the UE may determine that the transmission of Message A has failed. The range of the certain period may be defined in the specifications or configured in advance through higher layer signaling, etc., such as an RRC parameter, by a base station. The range of the certain period may also be referred to as a time window for receiving Message B or a time window for receiving Message B.

Specifically, if the UE does not receive Message B within the range of the certain period since transmission of Message A, the UE may start transmitting Message A in a certain occasion. The certain occasion may be an area (time, a frequency resource) that is configured for transmission of Message A.

<Retransmission Control is Supported>

Retransmission control of Message A may be supported. In this case, for example, if a base station has detected Message A, but fails to decode the payload of Message A, retransmission control is required.

Figure 5:
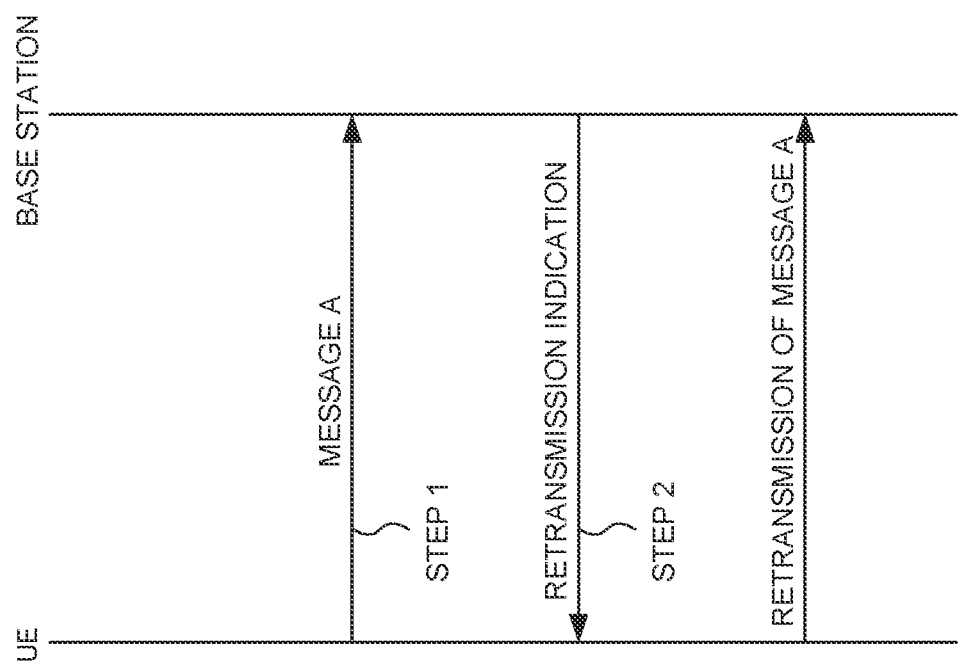
FIG. 5 is a diagram to show an example of retransmission control in the two-step RACH.

The base station that failed in reception processing (e.g., decoding) of Message A transmits a DL signal that indicates retransmission of Message A without transmitting Message B as a response signal to Message A (instead of Message B). The UE receives the DL signal that indicates the retransmission of Message A as a response signal to Message A (refer to FIG. 5).

The DL signal that indicates the retransmission of Message A may be a PDCCH (or DCI) that schedules the retransmission of Message A. The PDCCH (or a DCI format) may be CRC-scrambled with a radio network identifier for random access (e.g., an RA-RNTI). The UE may acquire information regarding the RA-RNTI that is applied based on the resource/sequence used for the transmission of Message A.

The PDCCH that indicates the retransmission of Message A may include a certain bit field. The certain bit field may be a bit field that is not included in the PDCCH that is used for scheduling Message B. For example, the certain bit field may be at least one of a new data indicator field (e.g., an NDI field), a retransmission control process number field (e.g., an HPN field), and a redundancy version field (e.g., an RV field).

The UE may determine whether to perform retransmission, based on the content of the bit field included in the PDCCH transmitted in response to Message A.

When the UE retransmits Message A, the same content as that upon the initial transmission may be transmitted or a different content may be transmitted. For example, part of the content of the initially transmitted Message A may be transmitted. As an example, a certain message (e.g., a Message A payload) may be transmitted without transmitting a preamble.

When the UE retransmits Message A (e.g., Message A payload) in accordance with the retransmission indication, the UE may use a certain resource/sequence. For example, the UE may retransmit Message A using the resource/sequence configured in advance from the network (e.g., the same resource/sequence as that of the initial transmission).

Alternatively, the UE may retransmit Message A by using the resource/sequence that is specified by a DL signal that indicates retransmission (e.g., PDCCH). In this case, the resource/sequence that is used for retransmission of Message A can be dynamically and flexibly controlled.

The base station may instruct retransmission of Message A by using MAC control information (e.g., a MAC RAR). The MAC control information may be included in Message B. In this case, the UE may receive a PDSCH that is scheduled by the PDCCH transmitted in response to the transmission of Message A (e.g., also referred to as an RAR UL grant or an RAR grant) and control the retransmission, based on the MAC control information included in the PDSCH.

The RAR grant may include a certain bit field (e.g., an NDI field). For example, a reserve bit included in the RAR grant may be used as the NDI bit. Alternatively, the CSI request field bit included in the RAR grant may be replaced with the NDI field and used. In this way, it is possible to configure an NDI field while suppressing the number of bits of the RAR grant.

The UE may determine interpretation of MAC control information, based on a certain field (e.g., an NDI field) included in the RAR grant.

When a response signal to Message A is not transmitted from the base station, the UE may transmit Message A in a certain occasion. In this case, the control may be conducted in a similar way to the case where retransmission is not supported.

Whether the UE re-builds or re-transmits a certain message (e.g., a payload part of existing Msg. 3 or Msg. A) included in Message A, may be determined based on certain conditions. For example, this may be determined according to a certain bit field (e.g., an NDI field) included in a PDCCH transmitted in response to Message A. As an example, the control may be conducted so that new transmission (new Tx) is performed if NDI=0, and retransmission (Re-Tx) is performed if NDI=1.

Alternatively, the UE side may autonomously determine whether to re-build or re-transmit the message.

The base station may store or flush a plurality of Messages A that were transmitted from the UE (e.g., initial transmission and retransmission). As an example, the base station may soft-combine the payloads of Messages A that the base station failed to receive.

Case B
<Retransmission Control is not Supported>
In this case, the control may be conducted in a similar way to the case where retransmission control is not supported in case A.
<Retransmission Control is Supported>
Retransmission control of Message A may be supported. In this case, for example, if a base station has detected Message A but fails to decode the payload of Message A, retransmission control is required.

The base station that has failed the reception processing (e.g., decoding) of Message A transmits a DL signal that indicates retransmission of Message A instead of Message B being a response signal to Message A. The UE receives the DL signal that indicates the retransmission of Message A as a response signal to Message A.

The DL signal that indicates the retransmission of Message A may be a PDCCH (or DCI) that schedules the retransmission of Message A. The PDCCH (or a DCI format) may be transmitted in a common search space or in a UE specific search space.

Further, the PDCCH may be CRC-scrambled with a certain identifier (e.g., a C-RNTI or an MCS-C-RNTI, etc.) instead of an RA-RNIT. In this way, the UE behaviors can be simplified without the need for the UE to acquire information regarding the RA-RNTI.

Note that other behaviors and control may be controlled in a similar way to the case where retransmission control is supported in case A.

(Fourth Aspect)
In a fourth aspect, retransmission of Message B (a DL signal) transmitted from a base station at step 2 in the two-step RACH (step 1 and step 2) will be described.

The retransmission of Message B, for example, corresponds to a case where the UE does not receive Message B transmitted from a base station or a case where the UE detects a PDCCH that is included in Message B transmitted from a base station but fails to decode the payload of Message B.

Figure 6:
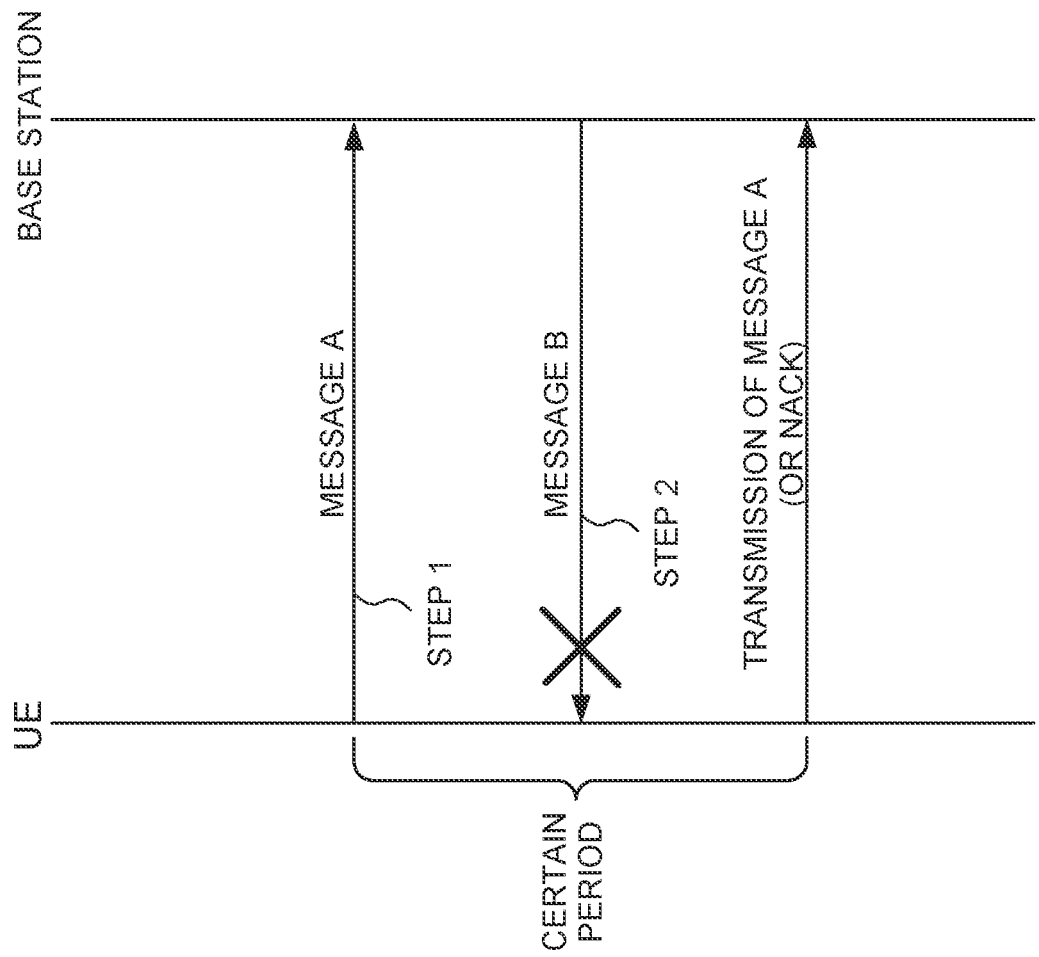
FIG. 6 is a diagram to show another example of the retransmission control in the two-step RACH.

If the UE does not receive Message B within a range of a certain period after transmitting Message A, the UE may start transmission of Message A in a certain occasion (refer to FIG. 6). The certain occasion may be an area that is configured for transmission of Message A. The range of the certain period may be defined in the specifications or may be configured in advance from the base station. The range of the certain period may also be referred to as a time window for receiving Message B or a time window for receiving Message B.

In contrast, if the UE detected a PDCCH included in Message B transmitted from the base station, but fails to decode the payload of Message B, the UE may start transmission of Message A by using a certain occasion. In this case, the control may be conducted in a similar way to the case where the UE does not receive Message B (including a PDCCH).

Alternatively, if the UE does not receive Message B within the range of a certain period after transmitting Message A, the UE may transmit a transmission confirmation signal (e.g., NACK) in an attempt to receive Message B to be retransmitted from the base station within the range of a certain period. The UE may determine the certain period (also referred to as a time window) for receiving retransmission of Message B, based on the transmission timing of the NACK. Further, the UE may transmit ACK when having successfully received Message B or transmit NACK when having failed to receive Message B without transmitting ACK.

<Configuration of Retransmission Control>

Whether to apply retransmission control to one or each of Message A (e.g., the payload of Message A) and Message B (e.g., the payload of Message B) may be commonly configured for each type of random access procedure (CB RACH/CF RACH) or independently set.

For example, a configuration may support retransmission control of Message A and retransmission control of Message B for the CB RACH and CF RACH (Case A of FIG. 7).

Another configuration may support retransmission control of Message A yet may not support retransmission control of Message B for the CB RACH and CF RACH (Case B of FIG. 7).

Another configuration may not support retransmission control of Message A yet may support retransmission control of Message B for the CB RACH and CF RACH (Case C of FIG. 7).

Another configuration may not support either retransmission control of Message A or retransmission control of Message B for the CB RACH and CF RACH (Case D of FIG. 7).

Note that, here, the above description describes cases where whether to support retransmission control of Message A and retransmission control of Message B for the CB RACH and CF RACH is commonly set, without limitation. Whether to support retransmission control of Message A and retransmission control of Message B for the CB RACH and CF RACH may be independently set.

Whether to support retransmission control of Message A and retransmission control of Message B may be defined in advance in the specifications or may be configured to the UE from the base station by using higher layer signaling, etc.

As such, controlling the presence of retransmission control according to the type of RACH allows flexible retransmission control.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 8:
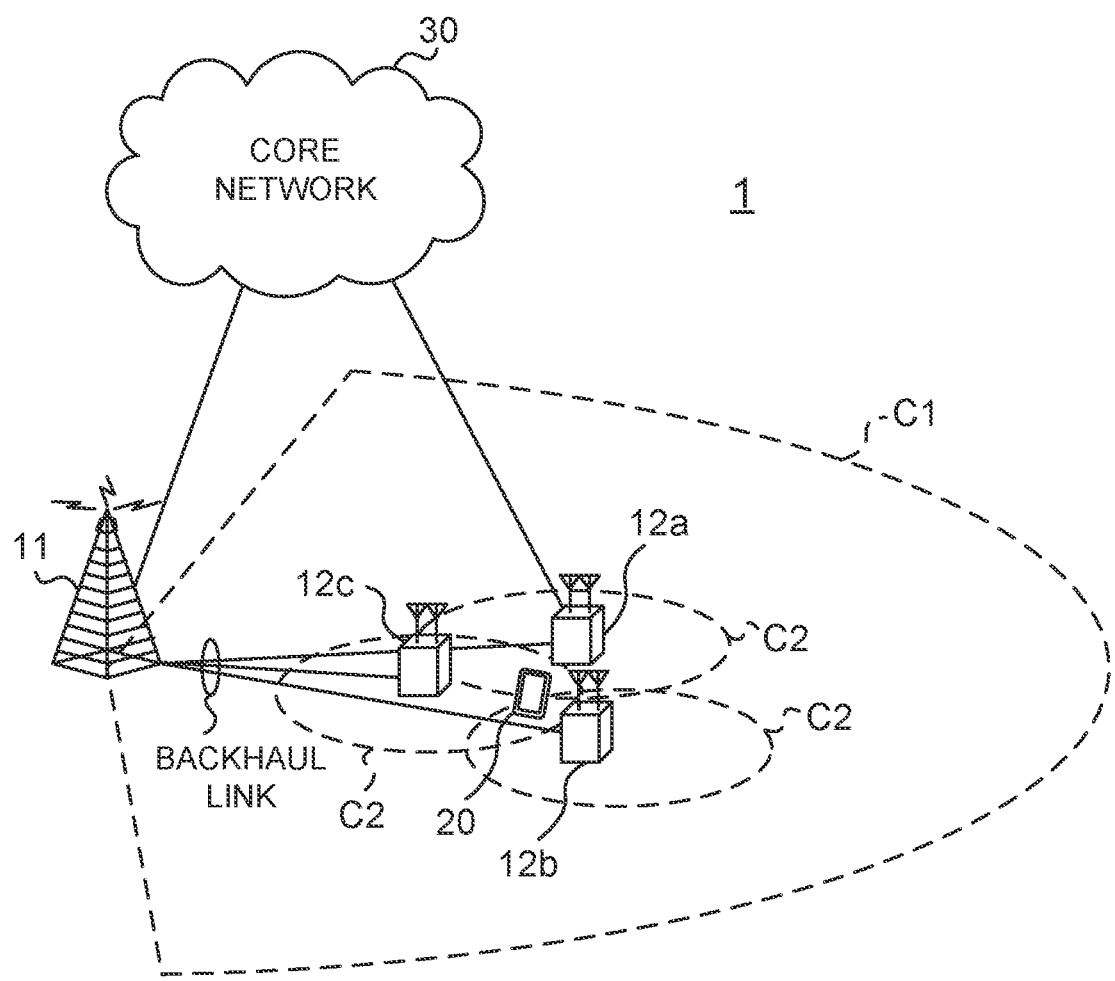
FIG. 8 is a diagram to show an example of a schematic structure of a radio communication system according to one embodiment.

FIG. 8 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
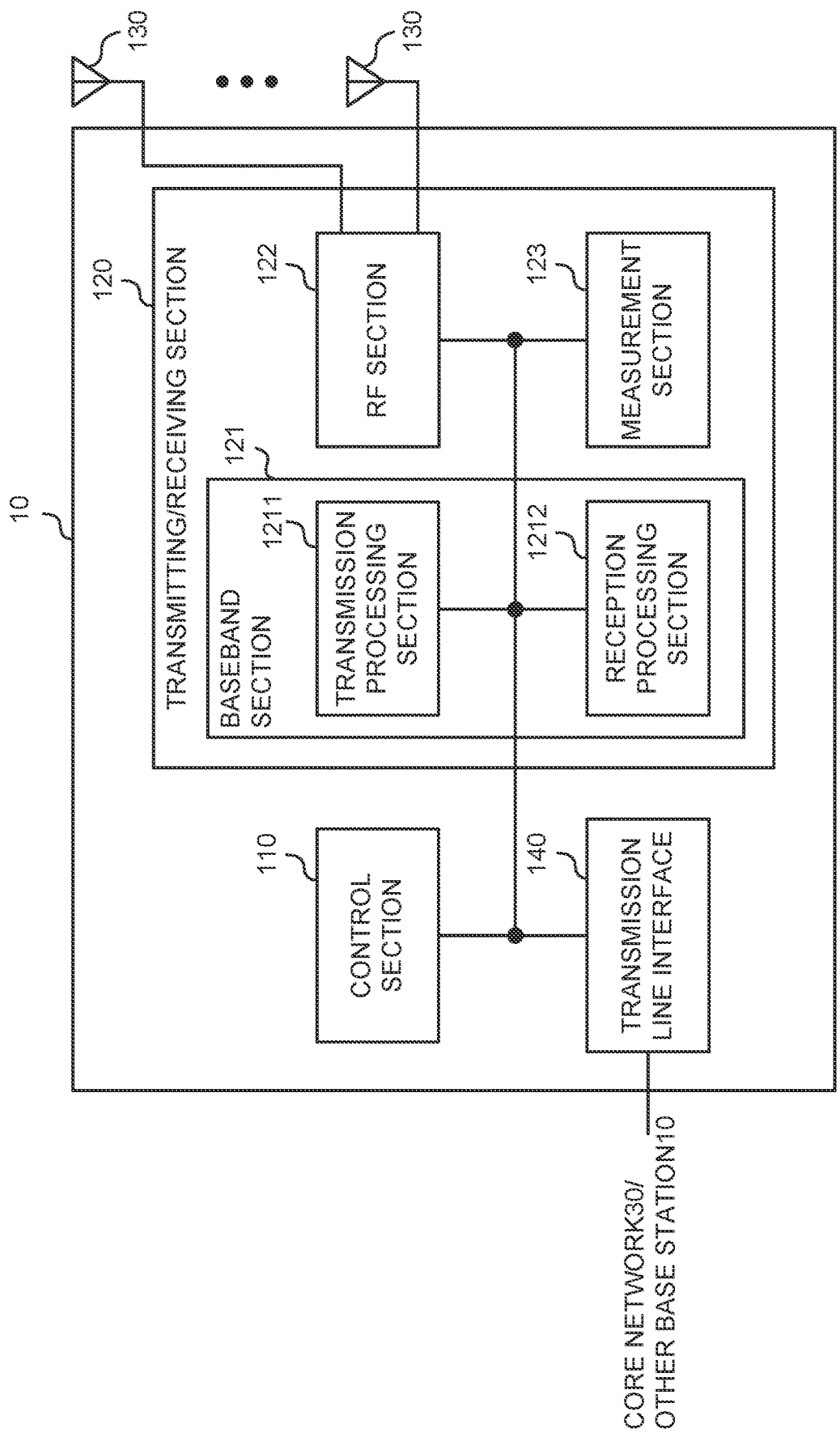
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 receives a UL signal that includes a random access preamble and a certain message. The transmitting/receiving section 120 transmits a DL signal transmitted in response to the UL signal.

The control section 110 controls at least one of reception of a UL signal and transmission of a DL signal by applying a common behavior to a first procedure that transmits a UL signal in accordance with an indication from a network (e.g., a CB RACH) and a second procedure that transmits a UL signal without any indication from the network (e.g., a CF RACH).

Alternatively, the control section 110 controls at least one of reception of a UL signal and transmission of a DL signal by applying different behaviors to a first procedure that transmits a UL signal in accordance with an indication from a network (e.g., a CB RACH) and a second procedure that transmits a UL signal without any indication from the network (e.g., a CF RACH).

The control section 110 may also control retransmission of Message A and Message B.

(User Terminal)

Figure 10:
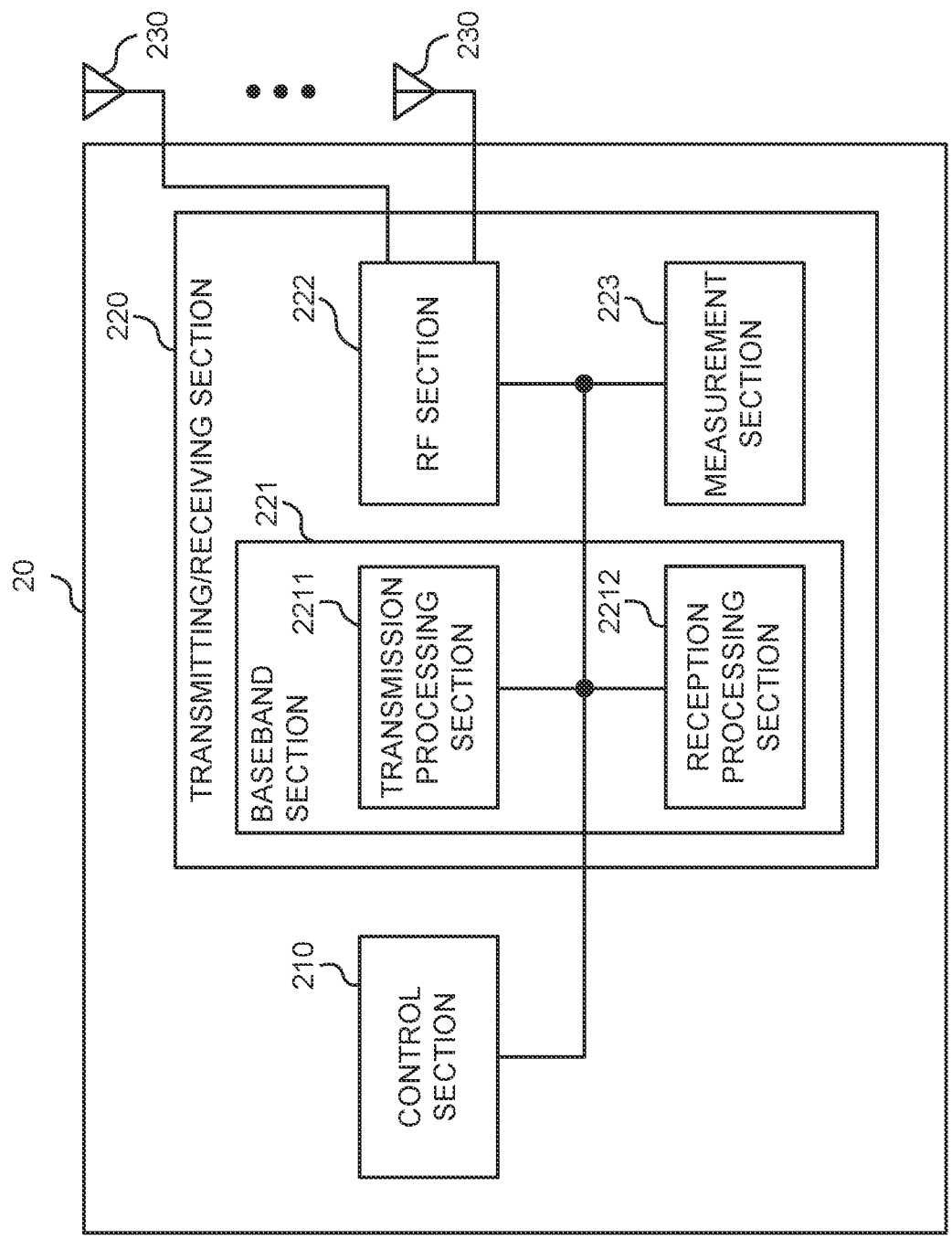
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 transmits a UL signal that includes a random access preamble and a certain message. The transmitting/receiving section 220 receives a DL signal transmitted in response to the UL signal.

The control section 210 may control at least one of transmission of a UL signal and reception of a DL signal by applying a common behavior to a first procedure that transmits a UL signal, in accordance with an indication from a network (e.g., a CB RACH) and a second procedure that transmits a UL signal without any indication from the network (e.g., a CF RACH).

For example, the control section 210 may include, in a UL signal, a user identifier other than the identifier configured from the network in the first procedure and the second procedure. The control section 210 may receive a DL signal, based on a radio network identifier for random access, in the first procedure and the second procedure.

Alternatively, the control section 210 may control at least one of transmission of a UL signal and reception of a DL signal by applying different behaviors to a first procedure that transmits a UL signal in accordance with an indication from a network (e.g., a CB RACH) and a second procedure that transmits a UL signal without any indication from the network (e.g., a CF RACH).

For example, the control section 210 may include, in a UL signal, a user identifier other than the identifier configured from the network in the first procedure and include the identifier configured from the network in a UL signal in the second procedure. The control section 210 may receive the DL signal, based on a radio network identifier for random access in the first procedure and receive the DL signal, based on a radio network identifier other than the radio network identifier for random access in the second procedure.

The control section 210 may determine whether to retransmit a UL signal, based on at least one of a period since receiving the DL signal, an indication content of the DL signal, and a content of a bit field that is configured in a downlink control channel included in the DL signal.

The control section 210 may retransmit the UL signal when the downlink control channel includes at least one of a new data indicator field, a retransmission control process number field, and a redundancy version field.

The control section 210, when retransmitting the UL signal, may apply at least one of a resource and a sequence that are configured in advance. Alternatively, the control section 210, when retransmitting the UL signal, may apply at least one of a resource and a sequence that are specified by the downlink control channel.

The control section 210 may control to transmit the UL signal if failing to receive a message that is scheduled by the received downlink control channel.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using this plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
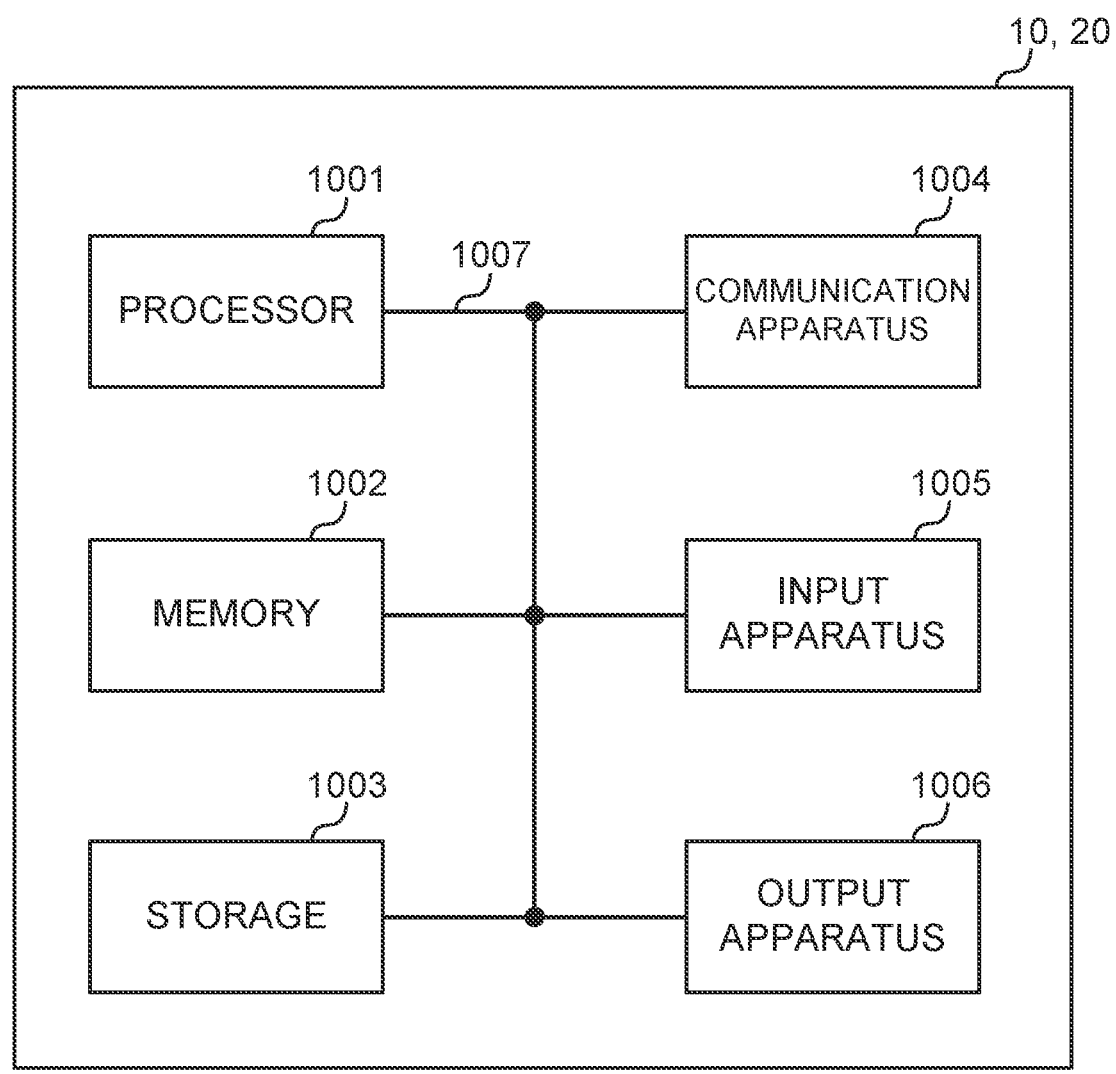
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 MS.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal,"

"wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that determines, based on higher layer signaling indicating transmission of message A including a random access preamble, whether or not to apply a 2-step contention-free random access procedure;
    a transmitter that, when the 2-step contention-free random access procedure is applied, transmits the message A; and
    a receiver that receives, as a response to the message A, message B including a downlink control channel received in a common search space set,
    wherein cyclic redundancy check (CRC) of downlink control information on the downlink control channel is scrambled by an identifier included in the message A.

2. The terminal according to claim 1, wherein when the 2-step contention-free random access procedure is applied, the transmitter transmits the message A by using a resource corresponding to a synchronization signal block.

3. A radio communication method for a terminal, comprising:
    determining, based on higher layer signaling indicating transmission of message A including a random access preamble, whether or not to apply a 2-step contention-free random access procedure;
    when the 2-step contention-free random access procedure is applied, transmitting the message A; and
    receiving, as a response to the message A, message B including a downlink control channel received in a common search space set,
    wherein cyclic redundancy check (CRC) of downlink control information on the downlink control channel is scrambled by an identifier included in the message A.

4. A base station comprising:
    a processor that indicates, by using higher layer signaling indicating transmission of message A including a random access preamble, whether or not to apply a 2-step contention-free random access procedure;
    a receiver that, when the 2-step contention-free random access procedure is applied, receives the message A; and
    a transmitter that transmits, as a response to the message A, message B including a downlink control channel received in a common search space set,
    wherein cyclic redundancy check (CRC) of downlink control information on the downlink control channel is scrambled by an identifier included in the message A.

5. A system comprising a terminal and a base station, wherein
    the terminal comprises:
        a processor that determines, based on higher layer signaling indicating transmission of message A including a random access preamble, whether or not to apply a 2-step contention-free random access procedure;
        a transmitter that, when the 2-step contention-free random access procedure is applied, transmits the message A; and
        a receiver that receives, as a response to the message A, message B including a downlink control channel received in a common search space set,
        wherein cyclic redundancy check (CRC) of downlink control information on the downlink control channel is scrambled by an identifier included in the message A, and
    the base station comprises:
        a receiver that receives the message A; and
        a transmitter that transmits the message B.

* * * * *